(12) United States Patent
Zha et al.

(10) Patent No.: US 12,155,926 B2
(45) Date of Patent: Nov. 26, 2024

(54) VIDEO GENERATION METHOD AND APPARATUS FOR GUIDING USERS TO TAKE HIGH-QUALITY VIDEOS

(71) Applicant: Beijing Zitiao Network Technology Co., Ltd., Beijing (CN)

(72) Inventors: Xinyi Zha, Beijing (CN); Tianqi Zhang, Beijing (CN); Ran Cui, Beijing (CN); Shuaiqi Xiong, Beijing (CN); Jiayi Li, Beijing (CN); Junfeng Xue, Beijing (CN); Jianglong Zheng, Beijing (CN); Weixuan Pan, Beijing (CN); Tao Wang, Beijing (CN); Song Jia, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/539,122

(22) Filed: Dec. 13, 2023

(65) Prior Publication Data

US 2024/0114234 A1   Apr. 4, 2024

Related U.S. Application Data

(63) Continuation of application No. PCT/CN2022/120168, filed on Sep. 21, 2022.

(30) Foreign Application Priority Data

Sep. 23, 2021 (CN) .......................... 202111117291.9

(51) Int. Cl.
   *H04N 23/63*   (2023.01)
   *G06V 20/00*   (2022.01)

(52) U.S. Cl.
   CPC ........... *H04N 23/633* (2023.01); *G06V 20/35* (2022.01)

(58) Field of Classification Search
   CPC ............................ H04N 23/633; G06V 20/35
   See application file for complete search history.

(56) References Cited

U.S. PATENT DOCUMENTS

| 11,635,873 B2* | 4/2023 | Shu ...................... G06F 1/1643 715/719 |
| 2010/0302409 A1 | 12/2010 | Matas et al. |

(Continued)

FOREIGN PATENT DOCUMENTS

| CN | 106454097 A | 2/2017 |
| CN | 111212234 A | 5/2020 |

(Continued)

OTHER PUBLICATIONS

International Patent Application No. PCT/CN2022/120168; Int'l Search Report; dated Dec. 12, 2022; 3 pages.

(Continued)

*Primary Examiner* — Twyler L Haskins
*Assistant Examiner* — Fayez A Bhuiyan
(74) *Attorney, Agent, or Firm* — BakerHostetler

(57) ABSTRACT

The present disclosure provides a video generation method and apparatus, a device, and a storage medium. The method includes: playing a first video for prompting a video taking style on a video taking page in the form of a floating window, wherein the video taking page presents a taken image preview region for presenting a taken image in preview and a video taking control; recording, in response to a triggering operation on the video taking control, the taken image in the taken image preview region to generate a second video, wherein the second video and the first video have a same style. In this way, the second video is taken by playing, on the video taking page, the first video used for prompting the video taking style, so that an ordinary user (Continued)

can be guided to take a high-quality video, and the video taking experience of the user is improved.

20 Claims, 8 Drawing Sheets

(56) References Cited

U.S. PATENT DOCUMENTS

| | | | |
|---|---|---|---|
| 2016/0028962 A1* | 1/2016 | Matas | H04N 21/4334 |
| | | | 348/333.02 |
| 2018/0096202 A1* | 4/2018 | Stathacopoulos | G06F 1/1694 |
| 2021/0405952 A1* | 12/2021 | Wang | G06F 3/0486 |
| 2022/0269405 A1* | 8/2022 | Wu | H04M 1/72439 |
| 2024/0031668 A1 | 1/2024 | Zhang et al. | |

FOREIGN PATENT DOCUMENTS

| | | |
|---|---|---|
| CN | 112087652 A | 12/2020 |
| CN | 112422831 A | 2/2021 |
| CN | 113093968 A | 7/2021 |
| EP | 3082019 A2 | 10/2016 |
| EP | 3833001 A1 | 6/2021 |
| WO | WO 2021/052292 A1 | 3/2021 |

OTHER PUBLICATIONS

European Patent Application No. 22872009.0; Extended Search Report; dated Aug. 30, 2024; 20 pages.

* cited by examiner

VIDEO GENERATION METHOD AND APPARATUS FOR GUIDING USERS TO TAKE HIGH-QUALITY VIDEOS

CROSS-REFERENCE TO RELATED APPLICATION(S)

This application is a Continuation Application of International Patent Application No. PCT/CN2022/120168, filed Sep. 21, 2022, which claims priority to Chinese Patent Application No. 202111117291.9, entitled "VIDEO GENERATION METHOD AND APPARATUS, DEVICE, AND STORAGE MEDIUM", filed with the China National Intellectual Property Administration on Sep. 23, 2021, the disclosures of which are incorporated herein by reference in their entireties.

FIELD

The present disclosure relates to the field of data processing, and in particular, to a video generation method and apparatus, a device, and a storage medium.

BACKGROUND

With the continuous development of a multimedia short video technology, users have increasingly high requirements for video taking. However, due to the fact that most users do not possess professional video taking skills, how to enable an ordinary user to take high-quality videos and improve the video taking experience of the user is currently an urgent technical problem that needs to be addressed.

SUMMARY

In order to solve the above technical problem or at least partially solve the above technical problem, the present disclosure provides a video generation method and apparatus, a device, and a storage medium, which can improve the video taking experience of a user.

In a first aspect, the present disclosure provides a voice generation method. The method includes:
  playing a first video on a video taking page in the form of a floating window, wherein the video taking page presents a taken image preview region and a video taking control; the taken image preview region is used for presenting a taken image in preview; the first video is used for prompting a video taking style; and
  recording, in response to a triggering operation on the video taking control, the taken image in the taken image preview region to generate a second video, wherein the second video and the first video have a same style.

In a possible implementation, before the playing a first video on a video taking page in the form of a floating window, the method further includes:
  presenting a first panel on the video taking page, wherein the first panel presents images respectively corresponding to a plurality of videos comprising the first video; and
  the playing a first video on a video taking page in the form of a floating window includes:
  playing the first video on the video taking page in the form of the floating window in response to a preset selection operation on an image corresponding to the first video presented on the first panel.

In a possible implementation, the presenting a first panel on the video taking page includes:
  presenting the first panel on the video taking page in response to a triggering operation on a preset first control on the video taking page;
  or,
  presenting the first panel on the video taking page based on an image recognition result and/or current positioning information of the taken image in the taken image preview region on the video taking page, wherein the first panel displays images respectively corresponding to videos determined based on the image recognition result and/or the current positioning information.

In a possible implementation, the first video is determined based on an image recognition result and/or current positioning information of the taken image in the taken image preview region on the video taking page.

In a possible implementation, before the playing a first video on a video taking page in the form of a floating window, the method further includes:
  presenting a detail page of the first video in response to a preset triggering operation on the first video in a first video stream, wherein a video taking entry is configured on the detail page; and
  the playing a first video on a video taking page in the form of a floating window includes:
  jumping to the video taking page from the detail page in response to a triggering operation on the video taking entry on the detail page of the first video, and playing the first video on the video taking page in the form of the floating window.

In a possible implementation, before the presenting a detail page of the first video in response to a preset triggering operation on the first video in a first video stream, the method further includes:
  presenting a preset second control on a video taking template search page; and
  presenting the first video stream in response to a triggering operation on the preset second control, wherein the first video stream and a video taking template currently presented on the video taking template search page belong to a same content category.

In a possible implementation, before the presenting a detail page of the first video in response to a preset triggering operation on the first video in a first video stream, the method further includes:
  presenting, in response to a triggering operation on a preset third control on a video playing page, the first video stream corresponding to the preset third control.

In a possible implementation, before the presenting a detail page of the first video in response to a preset triggering operation on the first video in a first video stream, the method further includes:
  presenting the first video stream based on current positioning information.

In a possible implementation, the method further includes:
  zooming in or zooming out a video window of the first video in response to a zoom in or zoom out operation on the video window of the first video.

In a possible implementation, the playing a first video on a video taking page in the form of a floating window includes:
  playing the first video on the video taking page in the form of the floating window based on a frame direction attribute of the first video, wherein the frame direction attribute comprises a lateral picture or a vertical picture.

In a possible implementation, the playing a first video on a video taking page in the form of a floating window includes:

cyclically playing the first video on the video taking page in the form of the floating window.

In a second aspect, the present disclosure provides a voice generation apparatus. The apparatus includes:

a first playing module, configured to play a first video on a video taking page in the form of a floating window, wherein the video taking page presents a taken image preview region and a video taking control; the taken image preview region is used for presenting a taken image in preview; the first video is used for prompting a video taking style; and a generation module, configured to record, in response to a triggering operation on the video taking control, the taken image to generate a second video, wherein the second video and the first video have a same style.

In a third aspect, the present disclosure provides a computer-readable storage medium, wherein the computer-readable storage medium stores instructions; and the instructions, when run on a terminal device, cause the terminal device to implement the above method.

In a fourth aspect, the present disclosure provides a device, including a memory, a processor, and a computer program stored on the memory and runnable on the processor, wherein the processor, when executing the computer program, implements the above method.

In a fifth aspect, the present disclosure provides a computer program product, wherein the computer program product includes a computer program/instruction, and the computer program/instruction, when executed by a processor, implements the above method.

Compared with the related art, the technical solutions provided by the embodiments of the present disclosure have the following advantages:

The embodiments of the present disclosure provide a video generation method. The method includes: first, playing a first video on a video taking page in the form of a floating window, wherein the video taking page presents a taken image preview region and a video taking control; the taken image preview region is used for presenting a taken image in preview; the first video is used for prompting a video taking style; and then, recording, in response to a triggering operation on the video taking control, the taken image in the taken image preview region to generate a second video, wherein the second video and the first video have a same style. According to the embodiments of the present disclosure, the second video is taken by playing, on the video taking page, the first video used for prompting the video taking style, so that an ordinary user can be guided to take a high-quality video, and the video taking experience of the user is improved.

BRIEF DESCRIPTION OF THE DRAWINGS

The drawings here are incorporated into and form part of the specification, showing the embodiments that comply with the present disclosure, and are used together with the specification to explain the principles of the present disclosure.

In order to describe the technical solutions in the embodiments of the present disclosure or in the related art more clearly, the following briefly introduces the accompanying drawings for describing the embodiments or the related art.

Apparently, a person of ordinary skill in the art may still derive other drawings from the accompanying drawings without creative effort.

Figure 1:
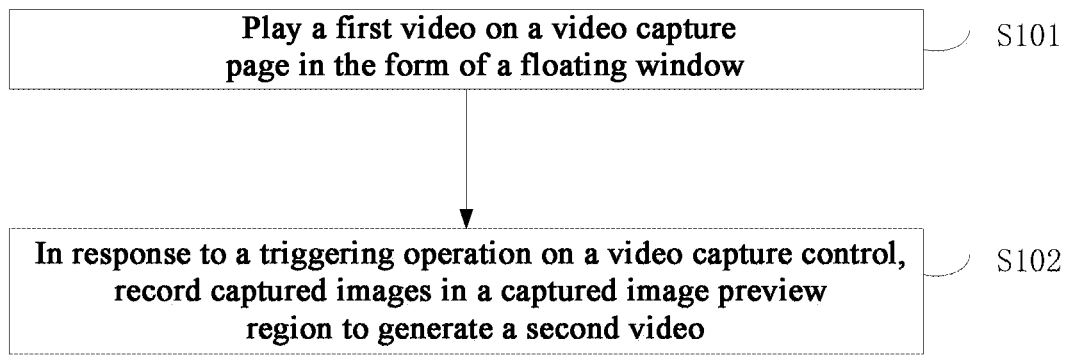
Figure 2:
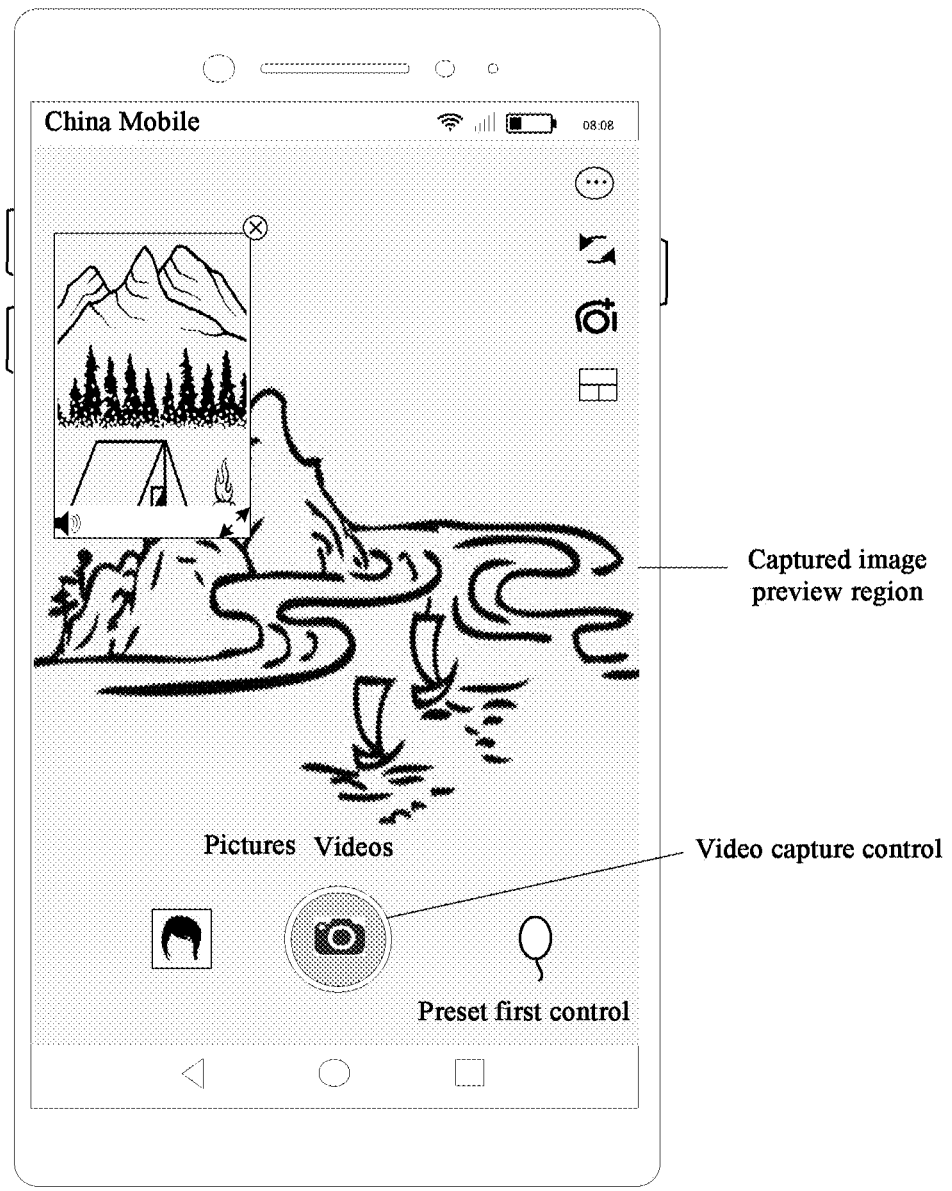
Figure 3:
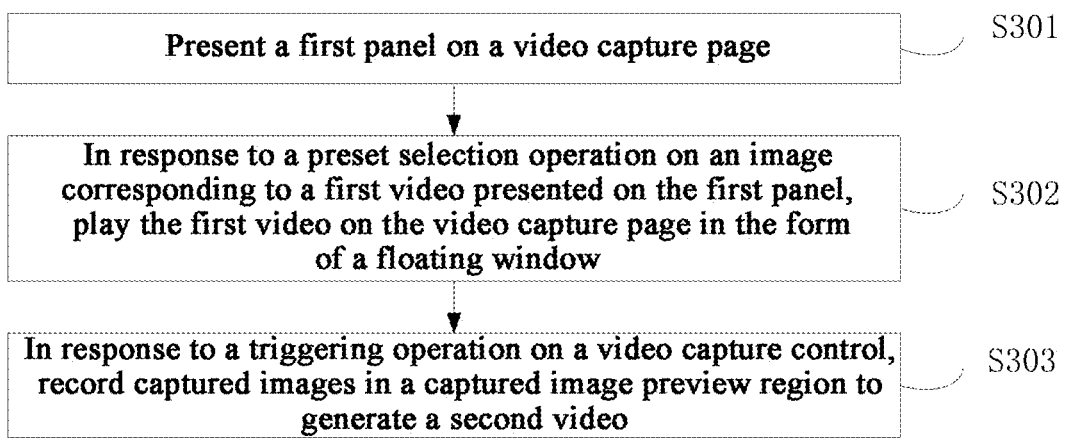
Figure 4:
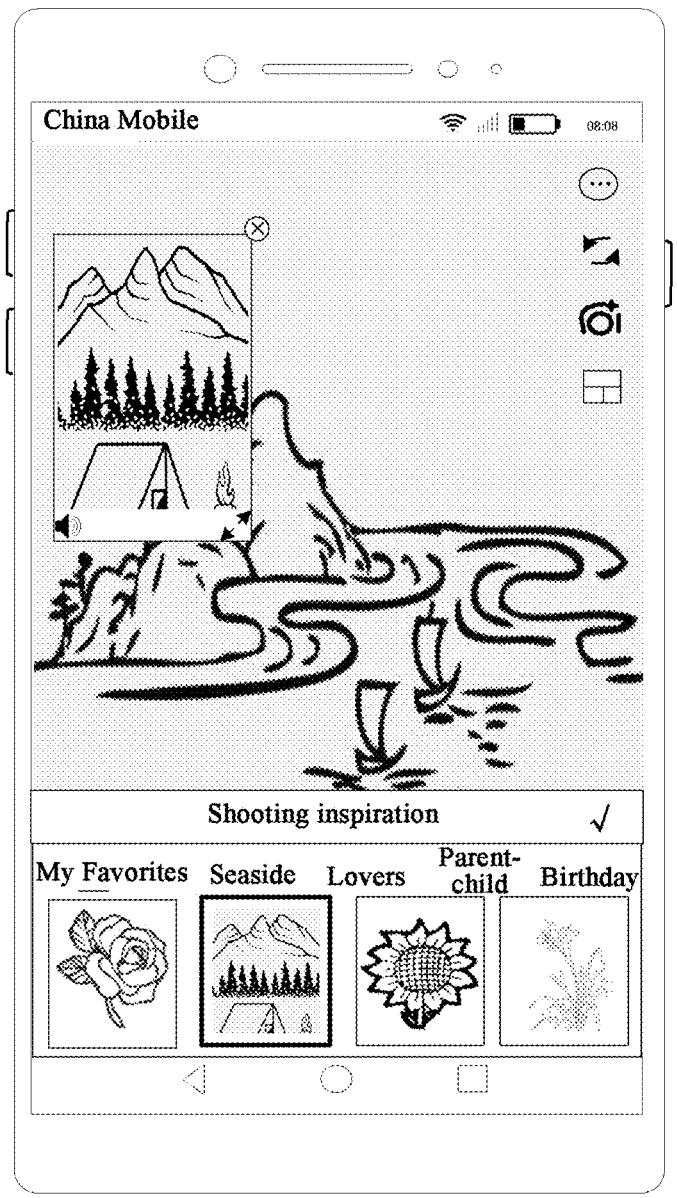
Figure 5:
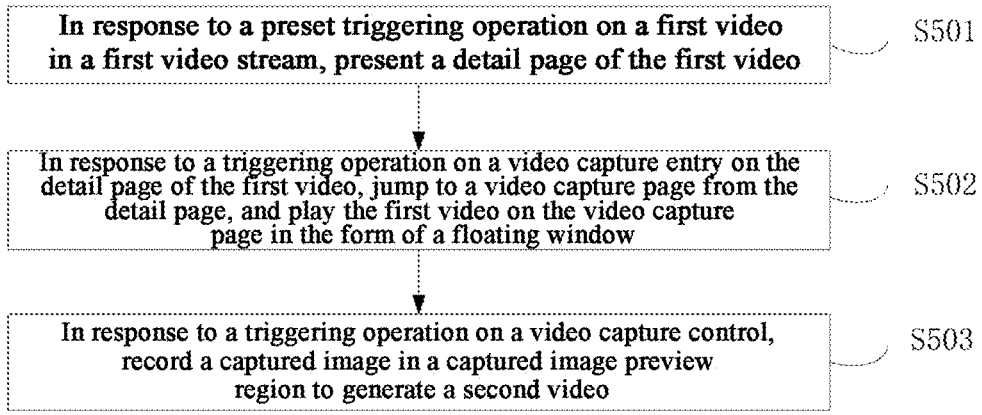
Figure 6:
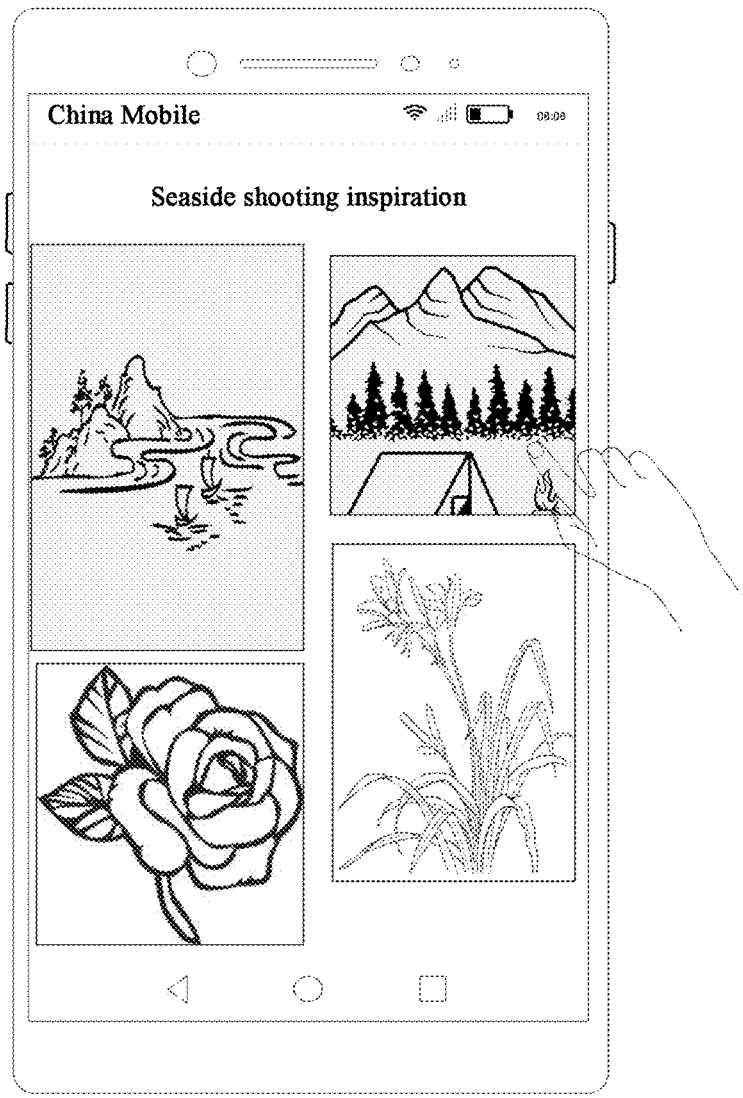
Figure 7:
Figure 8:
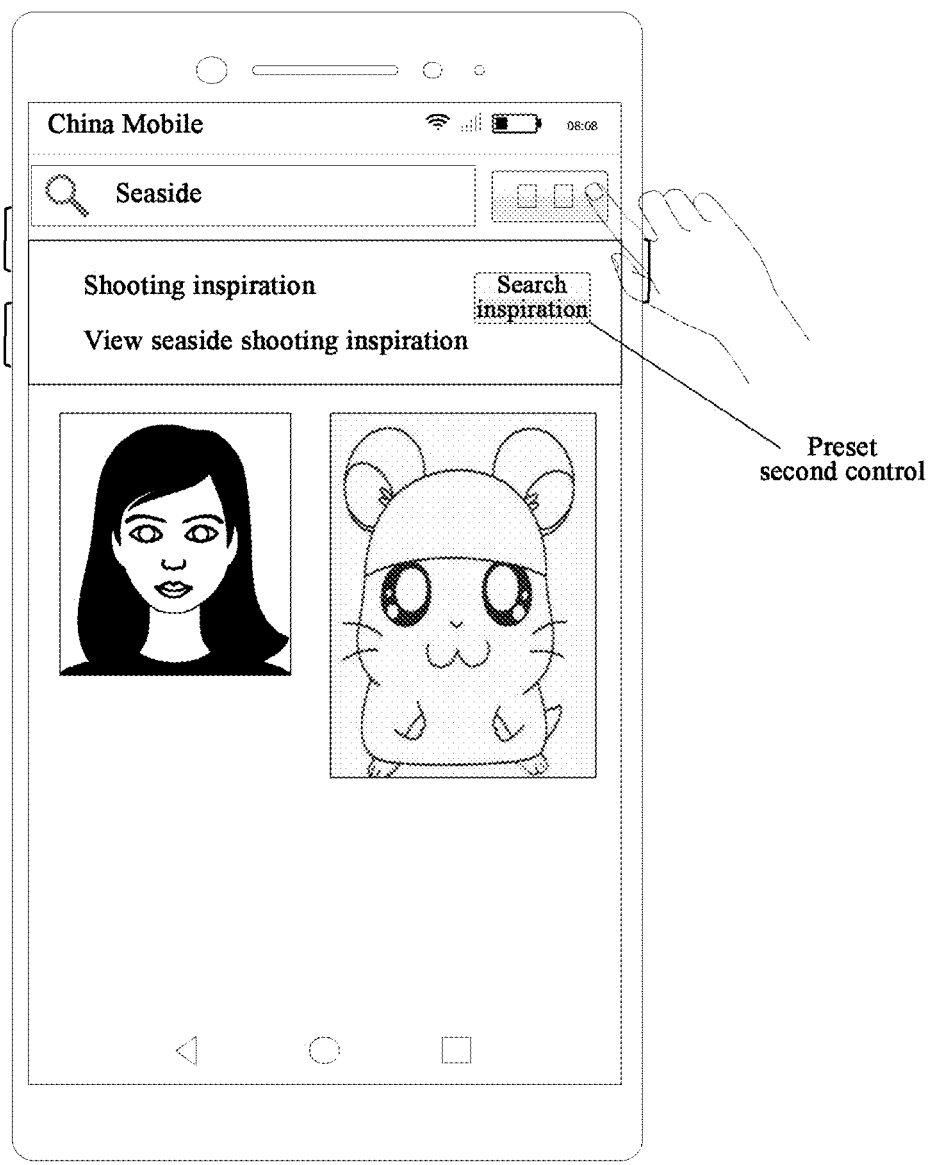
Figure 9:
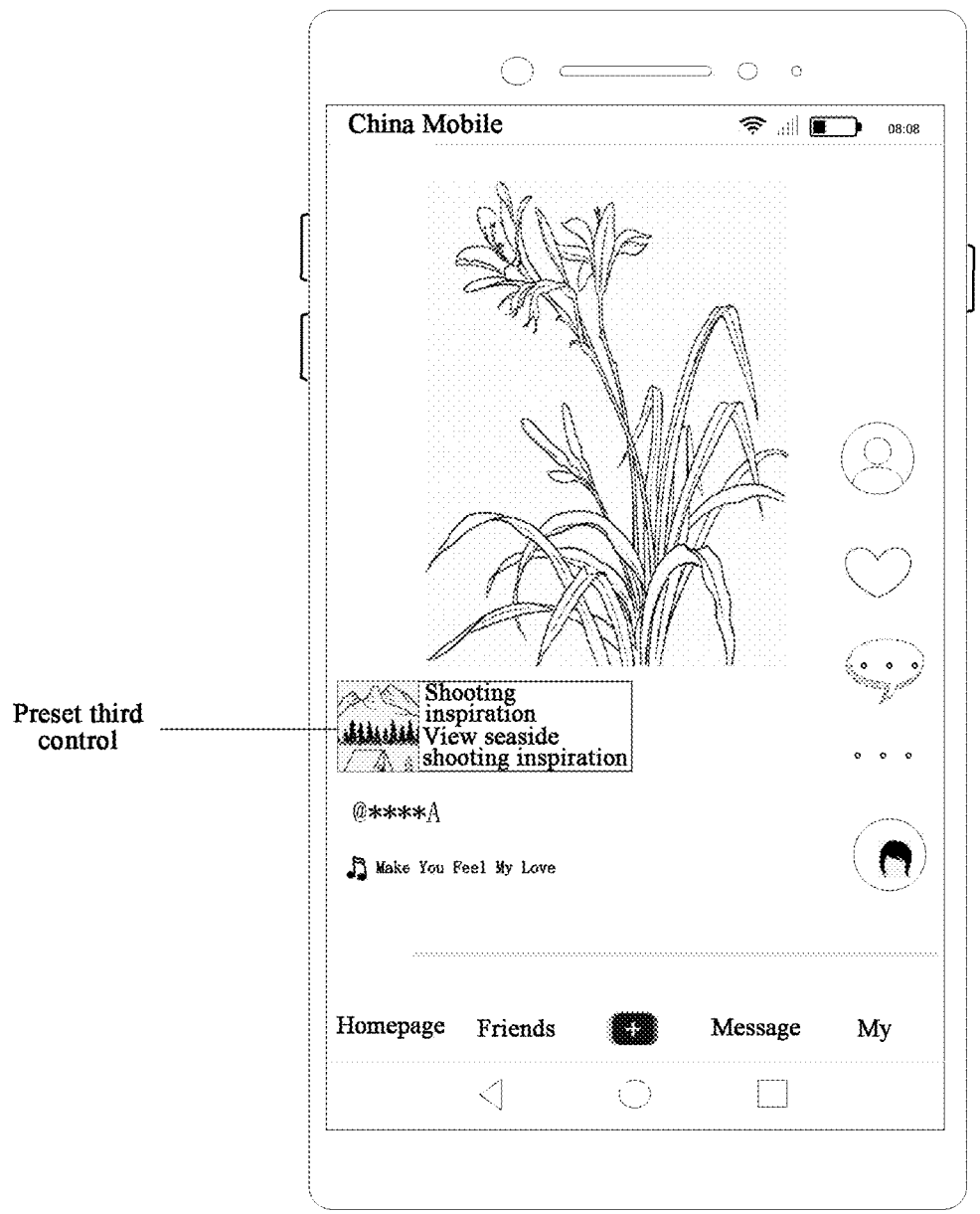
Figure 10:
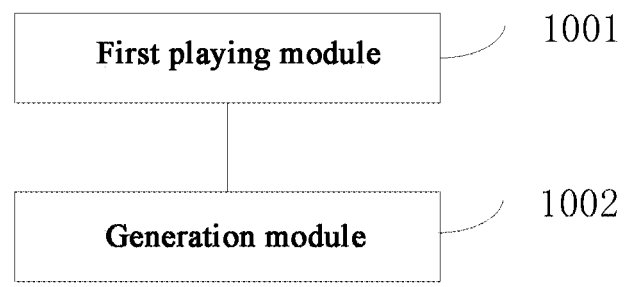
Figure 11:
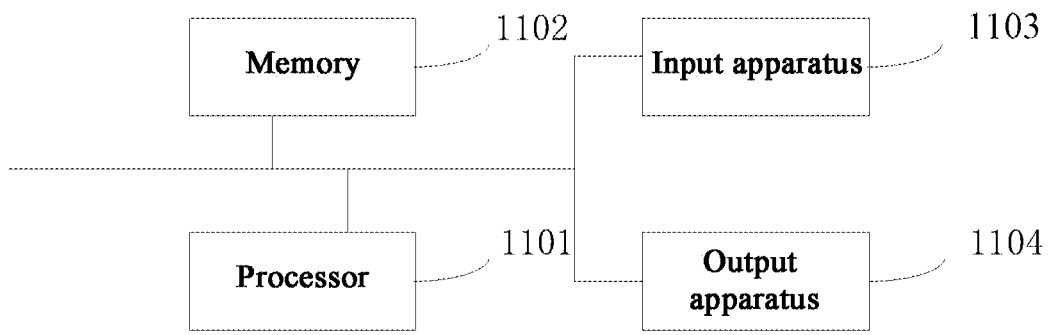

FIG. 1 is a flowchart of a video generation method according to an embodiment of the present disclosure;

FIG. 2 is a schematic diagram of a video taking page according to an embodiment of the present disclosure;

FIG. 3 is a flowchart of another video generation method according to an embodiment of the present disclosure;

FIG. 4 is a schematic diagram of another video taking page according to an embodiment of the present disclosure;

FIG. 5 is a flowchart of a further video generation method according to an embodiment of the present disclosure;

FIG. 6 is a schematic diagram of a presentation page of a first video stream according to an embodiment of the present disclosure;

FIG. 7 is a schematic diagram of a detail page of a first video according to an embodiment of the present disclosure;

FIG. 8 is a schematic diagram of a video taking template search page according to an embodiment of the present disclosure;

FIG. 9 is a schematic diagram of a video playing page according to an embodiment of the present disclosure;

FIG. 10 is a schematic structural diagram of a video generation apparatus according to an embodiment of the present disclosure; and FIG. 11 is a schematic structural diagram of a video generation device according to an embodiment of the present disclosure.

DETAILED DESCRIPTION OF EMBODIMENTS

In order to better understand the above objectives, features, and advantages of the present disclosure, the following will further describe the solutions of the present disclosure. It should be noted that the embodiments of the present disclosure and features in the embodiments may be mutually combined without conflicts.

Many specific details have been elaborated in the following description to facilitate a full understanding of the present disclosure, but the present disclosure can also be implemented in other ways different from those described here. Obviously, the embodiments in the specification are only part of the embodiments of the present disclosure, rather than all the embodiments.

With the continuous development of a multimedia short video technology, there is a trend that all people like to take videos. However, since ordinary users usually do not have professional video taking skills, how to lower a threshold for taking high-quality videos and enable most users to be able to take high-quality videos is currently an urgent technical problem that needs to be solved.

To this end, the embodiments of the present disclosure provide a video generation method. The method includes: first, playing a first video on a video taking page in the form of a floating window, wherein the video taking page presents a taken image preview region and a video taking control; the taken image preview region is used for presenting a taken image in preview; the first video is used for prompting a video taking style; and then, recording, in response to a triggering operation on the video taking control, the taken image in the taken image preview region to generate a second video, wherein the second video and the first video have a same style. According to the embodiments of the present disclosure, the second video is taken by playing, on the video taking page, the first video used for prompting the video taking style, so that an ordinary user can be guided to take a high-quality video, and the video taking experience of the user is improved.

Based on this, the embodiments of the present disclosure provide a video generation method. FIG. 1 shows a flowchart of a video generation method according to an embodiment of the present disclosure. The method includes the following S101 to S102:

S101: A first video is played on a video taking page in the form of a floating window.

The video taking page presents a taken image preview region and a video taking control. The taken image preview region is used for presenting a taken image in preview, and the first video is used for prompting a video taking style.

In the embodiments of the present disclosure, the first video can be a video that can prompt the video taking style. For example, the first video can be a tutorial video of taking a video, or the like. The video taking style prompted by the first video can include a content video taking style and/or a shooting video taking style. Specifically, the content video taking style can include a color of taking a video, a theme, a scenario, and the like, while the shooting video taking style can include a composition of taking a video, a camera movement technique, and the like, In the embodiments of the present disclosure, after the first video is determined, the first video can be played on the video taking page in the form of the floating window. FIG. 2 is a schematic diagram of a video taking page according to an embodiment of the present disclosure. The video taking page presents a taken image preview region and a video taking control. Specifically, the taken image preview region is used for presenting a taken image in preview, that is, the taken image captured by a camera lens of a camera is previewed and presented in the taken image preview region.

As shown in FIG. 2, the first video is played on the video taking page in the form of the floating window. Specifically, the first video can be played cyclically on the video taking page to continuously remind a user of the video taking style in a video taking process.

In addition, according to the embodiments of the present disclosure, a video window of the first video can be zoomed in or zoomed out after a zoom in or zoom out operation on the video window of the first video has been received. As shown in FIG. 2, the floating window where the first video is located has a zoom control. By clicking on the zoom control, a user can trigger the zoom in or zoom out operation on the floating window where the first video is located, thus achieving an effect of zooming in or zooming out the floating window where the first video is located. For example, the zoom control is clicked to achieve a display effect of zooming in the floating window where the first video is located by 1.5 times. A click on the zoom control again can achieve an effect of restoring the floating window where the first video is located.

In addition, the floating window where the first video is located has a close control. Clicking the close control at the top right side of the floating window can close the floating window where the first video is located and stop the playing of the first video.

In addition, the first video can carry audio information. For example, the first video carries audio information that guides a video taking style of a user. The floating window where the first video is located also has a volume adjustment control. A click on the volume adjustment control can adjust the volume of the first video. For example, the first video can be silently played by clicking the volume adjustment control.

In addition, the embodiments of the present disclosure can play the first video on the video taking page in the form of the floating window based on a frame direction attribute of the first video, wherein the frame direction attribute includes a transverse frame or a vertical frame. Assuming the first video is in a transverse frame, the first video is played on the video taking page in the form of the floating window in a landscape mode.

S102: The taken image in the taken image preview region is recorded, in response to a triggering operation on the video taking control, to generate a second video.

The second video and the first video have the same style.

In the embodiments of the present disclosure, when the triggering operation on the video taking control on the video taking page has been received, the taken image in the taken image preview region on the video taking page is recorded to obtain the second video. The second video is recorded based on the video taking style prompted in the first video. Therefore, the second video and the first video have the same style. Specifically, the second video and the first video have the same content style and/or shooting style.

In the video generation method provided by the embodiments of the present disclosure, first, a first video is played on a video taking page in the form of a floating window, wherein the video taking page presents a taken image preview region and a video taking control; the taken image preview region is used for presenting a taken image in preview; the first video is used for prompting a video taking style; and then, the taken image in the taken image preview region is recorded, in response to a triggering operation on the video taking control, to generate a second video, wherein the second video and the first video have a same style. According to the embodiments of the present disclosure, the second video is taken by playing, on the video taking page, the first video used for prompting the video taking style, so that an ordinary user can be guided to take a high-quality video, and the video taking experience of the user is improved.

Based on the above embodiment, the embodiments of the present disclosure further provide a video generation method. FIG. 3 shows a flowchart of another video generation method according to an embodiment of the present disclosure. The method includes the following S301 to S303:

S301: A first panel is presented on a video taking page.

The first panel presents images respectively corresponding to a plurality of videos including a first video.

In the embodiments of the present disclosure, the first panel can be displayed at any position on the video taking page, for example, a bottom of the video taking page. The first panel can present the images respectively corresponding to the respective videos in different categories according to video contents. For example, videos with video contents related to "seaside" can be presented in the same category, while videos with video contents related to "lovers" can be presented in the same category.

FIG. 4 is a schematic diagram of another video taking page according to an embodiment of the present disclosure. A first panel is presented at a bottom of the video taking page. The first panel presents images respectively corresponding to a plurality of videos in different categories, and each video can correspond to a cover image of the video.

In a possible implementation, a favorites control can be configured on the image corresponding to each video presented on the first panel. The favorites control on a certain image can be clicked to collect the video corresponding to that image. Subsequently, the video can be found in the folder "My Favorites" to achieve functions such as applying the video.

In the embodiments of the present disclosure, there are many ways to trigger the first panel to be presented on the video taking page. The following is an exemplary introduction, which will not limit the scope of the embodiments of the present disclosure.

In a possible implementation, a preset first control is displayed on the video taking page. When a triggering operation on the preset first control has been received, the first panel can be presented on the video taking page. Referring to FIG. 2, the preset first control can be displayed at a position shown in FIG. 2. In fact, the embodiments of the present disclosure will not limit a display position, a display icon, and the like of the preset first control.

In another possible implementation, the first panel can be presented on the video taking page based on an image recognition result and/or current positioning information of a taken image in a taken image preview region on the video taking page. The first panel displays images respectively corresponding to videos determined based on the image recognition result and/or the current positioning information.

In a possible application scenario, since the function of the first video is to prompt the video taking style, the embodiments of the present disclosure can recognize the taken image in the taken image preview region and determine a current object, a shooting scenario, or the like of the camera, so as to determine videos related to the current object, the shooting scenario, or the like of the camera for a user, and present videos related to the current object, the shooting scenario, or the like of the camera on the first panel as the basis of determining the first video.

Specifically, the first panel is presented on the video taking page based on the image recognition result of the taken image in the taken image preview region on the video taking page, wherein the first panel displays the images respectively corresponding to the videos determined based on the image recognition result. The image recognition result can include the object and/or the shooting scenario obtained by performing the image recognition on the taken image in the taken image preview region.

In another possible application scenario, since the video taking style may be related to a current geographical location of a user. For example, assuming that the user is currently at the seaside, the video taking style may be related to the seaside, and a first video related to the seaside can be determined for the user. Therefore, the embodiments of the present disclosure can display, on the first panel, images respectively corresponding to videos determined based on the current positioning information, and present the first panel on the video taking page.

In another possible application scenario, images of corresponding videos can be displayed on the first panel in combination with an image recognition result of a taken image in a taken image preview region on the video taking page and current positioning information, and the first panel is presented on the video taking page.

S302: The first video is played on the video taking page in the form of a floating window in response to a preset selection operation on an image corresponding to the first video presented on the first panel.

In the embodiments of the present disclosure, in a case that images corresponding to a plurality of videos are presented on the first panel on the video taking page, the preset selection operation can be triggered for an image corresponding to any video. Assuming that the preset selection operation is triggered for the image corresponding to the first video, the first video is played on the video taking page in the form of the floating window, so as to remind a user of the video taking style.

The preset selection operation can include a click operation on an image corresponding to any video, and the image is highlighted. As shown in FIG. 4, if one of the videos with the video contents related to "seaside" is highlighted, it indicates that the preset selection operation has been performed on the video. At this time, the video will be played on the video taking page in the form of the floating window.

In a possible implementation, when the preset selection operation on the image corresponding to the first video presented on the first panel has been received, the first video is played on the video taking page in the form of the floating window, which means that the first video is previewed. A user can switch the video played in the floating window on the video taking page by selecting other videos on the first panel.

A check control can also be configured on the first panel provided in the embodiments of the present disclosure, namely, a √ control displayed at the upper right corner of the first panel as shown in FIG. 4. The √ control is clicked to close the first panel, so that the most recently selected videos before the first panel is closed are played in the floating window on the video taking page.

S303: The taken image in the taken image preview region is recorded, in response to a triggering operation on a video taking control, to generate a second video.

The second video and the first video have the same style.

In the embodiments of the present disclosure, when the triggering operation on the video taking control on the video taking page has been received, the taken image in the taken image preview region is recorded to generate the second video. The second video is recorded based on the video taking style prompted in the first video. Therefore, the second video and the first video have the same style. Specifically, the second video and the first video have the same content style and/or shooting style.

According to the video generation method provided by the embodiments of the present disclosure, the second video is taken by playing, on the video taking page, the first video used for prompting the video taking style, so that an ordinary user can be guided to take a high-quality video, and the video taking experience of the user is improved.

Based on the above embodiment, the embodiments of the present disclosure further provide a video generation method. FIG. 5 shows a flowchart of a further video generation method according to an embodiment of the present disclosure. The method includes the following S501 to S503:

S501: A detail page of the first video is presented in response to a preset triggering operation on a first video in a first video stream.

A video taking entry is configured on the detail page.

In the embodiments of the present disclosure, the first video can be a recommended video stream, for example, a recommended tutorial video stream. The first video stream can also be a video stream related to a certain video content such as "seaside".

In practical applications, when a preset triggering operation on the first video in the first video stream has been received, the detail page of the first video can be presented. The detail page is used for presenting the first video in preview, and displaying detailed information of the first video, such as an author, a video style, and a video theme of the first video.

In addition, the video taking entry is configured on the detail page. The video taking entry can be clicked to enter a video taking page.

FIG. 6 is a schematic diagram of a presentation page of a first video stream according to an embodiment of the present disclosure. Contents in respective videos in the first video stream are all related to "seaside". For example, the first video stream can be a seaside shooting inspiration video stream. The presentation page of the first video stream can present cover images of the respective videos. A detail page of the video can be presented by clicking the cover image of any video. As shown in FIG. 6, after a click operation on a certain video (such as the first video) in the first video stream is triggered, it is possible to jump from the presentation page of the first video stream shown in FIG. 6 to the detail page of the first video. FIG. 7 is a schematic diagram of a detail page of a first video according to the embodiment of the present disclosure. A video taking entry "Start" is configured on the detail page. When the first video displayed on the detail page is slid up and down, objects displayed on the detail page can be switched based on an order of videos in the first video stream. For example, by sliding up, a currently displayed video can be switched to a previous video, achieving the presentation of a detail page of the previous video.

In the embodiments of the present disclosure, there are many interaction paths to enter the presentation page of the first video stream as shown in FIG. 6 above. The following is an exemplary introduction, not limiting the scope of the embodiments of the present disclosure.

In a possible implementation, a preset second control can be presented on the video taking template search page, and the first video stream is presented when a triggering operation on the preset second control has been received, wherein the first video stream and a video taking template currently presented on the video taking template search page belong to a same content category.

FIG. 8 is a schematic diagram of a video taking template search page according to an embodiment of the present disclosure. The video taking template search page is used for providing a user with a search function for a video taking template. After video taking template keywords entered by the user are searched, search results of the video taking template are presented on the video taking template search page, and the preset second control is also presented in a preset region on the video template search page, so as to enter the presentation page of the first video stream that belongs to the same content category as the search result of the video taking template.

Specifically, when a triggering operation on the preset second control shown in FIG. 8 above has been received, it is possible to jump from the video taking template search page shown in FIG. 8 to the presentation page of the first video stream shown in FIG. 6 above.

In another possible implementation, a preset third control can be presented on a video playing page. When a triggering operation on the preset third control has been received, the first video stream corresponding to the preset third control is presented. The first video stream corresponding to the preset third control is related to a video content of a currently played video on the video playing page. For example, if the video content of the currently played video is related to "seaside", the preset third control is clicked to present the first video stream related to "seaside".

FIG. 9 is a schematic diagram of a video playing page according to an embodiment of the present disclosure. A preset third control is presented on the video playing page. When the preset third control is clicked, it is possible to jump from the video playing page shown in FIG. 9 to the presentation page of the first video stream shown in FIG. 6 above.

In still another possible implementation, the first video stream can be presented based on current positioning information. Specifically, videos included in the first video stream are determined based on the current positioning information. For example, if the current positioning information indicates "seaside", the first video stream can include videos with video contents related to "seaside".

S502: Jumping to the video taking page from the detail page is performed in response to a triggering operation on the video taking entry on the detail page of the first video, and the first video is played on the video taking page in the form of a floating window.

In the embodiments of the present disclosure, when the triggering operation on the video taking entry on the detail page of the first video has been received, jumping from the detail page to the video taking page is achieved, and the first video is played n the video taking page in the form of the floating window. The user can take a video based on the video taking style prompted by the first video to generate the second video with the same style as that of the first video.

As shown in FIG. 7 above, when the triggering operation on the video taking entry on the detail page of the first video has been received, it is possible to jump from the detail page shown in FIG. 7 to the video taking page shown in FIG. 2 above.

S503: A taken image in a taken image preview region is recorded, in response to a triggering operation on a video taking control, to generate a second video.

The second video and the first video have the same style.

According to the video generation method provided by the embodiments of the present disclosure, the second video is taken by playing, on the video taking page, the first video used for prompting the video taking style, so that an ordinary user can be guided to take a high-quality video, and the video taking experience of the user is improved.

Based on the above embodiments, in order to improve the automation degree of the video generation method according to the embodiments of the present disclosure, the first video can be determined based on an image recognition result and/or current positioning information of the taken image in the taken image preview region on the video taking page, and the first video is played on the video taking page in the form of the floating window.

In a possible implementation, a preset fourth control can be presented on the video taking page. When a triggering operation on the preset fourth control has been received, image recognition can be performed on the taken image in the taken image preview region, and the first video is determined based on an image recognition result and is played on the video taking page in the form of the floating window.

In another possible implementation, when a triggering operation on the preset fourth control has been received, the first video can be determined based on current positioning information, and the first video is played on the video taking page in the form of the floating window.

In still another possible implementation, when a triggering operation on the preset fourth control has been received, the first video can be determined in combination with an image recognition result of the taken image in the taken image preview region and current positioning information, and the first video is played on the video taking page in the form of the floating window.

In the above implementations, the user only needs to trigger the preset fourth control to automatically play the first video on the video taking page. Therefore, the embodiments of the present disclosure can automatically play the first video used for prompting the video taking style for the user, which improves the user experience.

Based on the same inventive concept as the above method embodiment, the present disclosure further provides a multimedia resource editing apparatus. FIG. 10 is a schematic structural diagram of a video generation apparatus according to an embodiment of the present disclosure. The apparatus includes:

a first playing module 1001, configured to play a first video on a video taking page in the form of a floating window, wherein the video taking page presents a taken image preview region and a video taking control; the taken image preview region is used for presenting a taken image in preview; the first video is used for prompting a video taking style; and a generation module 1002, configured to record, in response to a triggering operation on the video taking control, the taken image to generate a second video, wherein the second video and the first video have a same style.

In a possible implementation, the apparatus further includes:

a first presentation module, configured to present a first panel on the video taking page, wherein the first panel presents images respectively corresponding to a plurality of videos comprising the first video.

Correspondingly, the first playing module is specifically configured to:

play the first video on the video taking page in the form of the floating window in response to a preset selection operation on an image corresponding to the first video presented on the first panel.

In a possible implementation, the first presentation module includes:

a first presentation submodule, configured to present the first panel on the video taking page in response to a triggering operation on a preset first control on the video taking page;

or, a second presentation submodule, configured to present the first panel on the video taking page based on an image recognition result and/or current positioning information of the taken image in the taken image preview region on the video taking page, wherein the first panel displays images respectively corresponding to videos determined based on the image recognition result and/or the current positioning information.

In a possible implementation, the first playing module is specifically configured to:

determine the first video based on an image recognition result and/or current positioning information of the taken image in the taken image preview region on the video taking page, and play the first video on the video taking page in the form of the floating window.

In a possible implementation, the apparatus further includes:

a second presentation module, configured to present a detail page of the first video in response to a preset triggering operation on the first video in a first video stream, wherein a video taking entry is configured on the detail page.

Correspondingly, the first playing module is specifically configured to:

jump to the video taking page from the detail page in response to a triggering operation on the video taking entry on the detail page of the first video, and play the first video on the video taking page in the form of the floating window.

In a possible implementation, the apparatus further includes:

a third presentation module, configured to present a preset second control on a video taking template search page; and a fourth presentation module, configured to present the first video stream in response to a triggering operation on the preset second control, wherein the first video stream and a video taking template currently presented on the video taking template search page belong to a same content category.

In a possible implementation, the apparatus further includes:

a fifth presentation module, configured to present, in response to a triggering operation on a preset third control on a video playing page, the first video stream corresponding to the preset third control.

In a possible implementation, the apparatus further includes:

a sixth presentation module, configured to present the first video stream based on current positioning information.

In a possible implementation, the apparatus further includes:

a zoom module, configured to zoom in or zoom out a video window of the first video in response to a zoom in or zoom out operation on the video window of the first video.

In a possible implementation, the first playing module is specifically configured to:

play the first video on the video taking page in the form of the floating window based on a frame direction attribute of the first video, wherein the frame direction attribute comprises a lateral picture or a vertical picture.

In a possible implementation, the first playing module is specifically configured to:

cyclically play the first video on the video taking page in the form of the floating window.

In the video generation apparatus provided by the embodiments of the present disclosure, first, a first video is played on a video taking page in the form of a floating window, wherein the video taking page presents a taken image preview region and a video taking control; the taken image preview region is used for presenting a taken image in preview; the first video is used for prompting a video taking style; and then, the taken image in the taken image preview region is recorded, in response to a triggering operation on the video taking control, to generate a second video, wherein the second video and the first video have a same style. According to the embodiments of the present disclosure, the second video is taken by playing, on the video taking page, the first video used for prompting the video taking style, so that an ordinary user can be guided to take a high-quality video, and the video taking experience of the user is improved.

In addition to the above method and apparatus, the embodiments of the present disclosure provide a computer-readable storage medium. The computer-readable storage medium stores instructions; and the instructions, when run on a terminal device, cause the terminal device to implement the video generation method according to the embodiments of the present disclosure.

The embodiments of the present disclosure further provide a computer program product. The computer program product includes a computer program/instruction, and the computer program/instruction, when executed by a processor, implements the above video generation method.

In addition, the embodiments of the present disclosure further provide a video generation device. Referring to FIG. 11, the video generation device can include:

a processor 1101, a memory 1102, an input apparatus 1103, and an output apparatus 1104. A quantity of the processor 1101 in the video generation device can be one or more. By way of example, FIG. 11 shows one processor. In some embodiments of the present disclosure, the processor 1101, the memory 1102, the input apparatus 1103, and the output apparatus 1104 can be connected through a bus or in another way. By way of example, FIG. 11 shows bus connection.

The memory 1102 may be configured to store software programs and modules. The processor 1101 runs the software programs and modules stored in the memory 1102, so as to implement various functional applications and data processing of the video generation device. The memory 1102 may mainly include a program storage region and a data storage region. The program storage region may store an operating system, an application program required by at least one function, and the like. In addition, the memory 1102 may include a high speed RAM, and may further include a non-volatile memory, such as at least one magnetic disk storage device, a flash memory, or another volatile solid storage device. The input apparatus 1103 may be configured to receive input numeric or character information and generate signal inputs related to user settings and function control of the video generation device.

Specifically, in this embodiment, the processor 1101 may load, according to the following instructions, executable files corresponding to processes of one or more application programs into the memory 1102. The processor 1101 runs the application programs stored in the memory 1102, to implement the various functions of the above video generation device.

It should be noted that in this document, relationship terms such as "first" and "second" are used solely to distinguish one entity or operation from another entity or operation without necessarily requiring or implying any actual such relationship or order between such entities or operations. Furthermore, the terms "include", "including", or any other variation thereof, are intended to encompass a non-exclusive inclusion, such that a process, method, article, or device that includes a list of elements does not include only those elements but may include other elements not explicitly listed or inherent to such process, method, article, or device. Without further limitation, an element defined by the phrase "including a/an . . . " does not exclude the presence of another identical elements in the process, method, article or device that includes the element.

The above only describes the specific implementations of the present disclosure, which enables those skilled in the art to understand or implement the present disclosure. The various modifications to these embodiments will be apparent to those skilled in the art, and the general principles defined herein can be implemented in other embodiments without departing from the spirit or scope of the present disclosure. Thus, the present disclosure is not limited to these embodiments shown herein, but accords with the broadest scope consistent with the principles and novel features disclosed herein.

We claim:

1. A video generation method, wherein the method comprising:

playing a first video on a video taking page in a form of a floating window, wherein the video taking page presents a taken image preview region and a video taking control, the taken image preview region is configured to present a taken image in preview, the first video is configured to prompt a video taking style;

in response to a triggering operation on the video taking control, recording the taken image in the taken image preview region to generate a second video, wherein the second video and the first video have a same style;

wherein before the playing the first video on the video taking page in the form of the floating window, the method further comprises in response to a preset triggering operation on the first video in a first video stream, presenting a detail page of the first video, wherein a video taking entry is configured on the detail page; and wherein the playing the first video on the video taking page in the form of the floating window further comprises:

in response to a triggering operation on the video taking entry on the detail page of the first video, jumping to the video taking page from the detail page, and playing the first video on the video taking page in the form of the floating window.

2. The method according to claim 1, wherein before the playing the first video on the video taking page in the form of the floating window, the method further comprises:

presenting a first panel on the video taking page, wherein the first panel presents images respectively corresponding to a plurality of videos comprising the first video; and the playing the first video on the video taking page in the form of the floating window comprises:

in response to a preset selection operation on an image corresponding to the first video presented on the first panel, playing the first video on the video taking page in the form of the floating window.

3. The method according to claim 2, wherein the presenting a first panel on the video taking page comprises:

in response to a triggering operation on a preset first control on the video taking page, presenting the first panel on the video taking page;

or, presenting the first panel on the video taking page based on an image recognition result and/or current positioning information of the taken image in the taken image preview region on the video taking page, wherein the first panel displays images respectively corresponding to videos determined based on the image recognition result and/or the current positioning information.

4. The method according to claim 1, wherein the first video is determined based on an image recognition result and/or current positioning information of the taken image in the taken image preview region on the video taking page.

5. The method according to claim 1, wherein before the presenting a detail page of the first video in response to a preset triggering operation on the first video in a first video stream, the method further comprises:

presenting a preset second control on a video taking template search page; and in response to a triggering operation on the preset second control, presenting the first video stream, the first video stream and a video taking template currently presented on the video taking template search page belonging to a same content category.

6. The method according to claim 1, wherein before the presenting a detail page of the first video in response to a preset triggering operation on the first video in a first video stream, the method further comprises:
in response to a triggering operation on a preset third control on a video playing page, presenting the first video stream corresponding to the preset third control.

7. The method according to claim 1, wherein before the presenting a detail page of the first video in response to a preset triggering operation on the first video in a first video stream, the method further comprises:
presenting the first video stream based on current positioning information.

8. The method according to claim 1, wherein the method further comprises:
in response to a zoom in or zoom out operation on the video window of the first video, zooming in or zooming out a video window of the first video.

9. The method according to claim 1, wherein the playing the first video on the video taking page in the form of the floating window comprises:
playing the first video on the video taking page in the form of the floating window based on a frame direction attribute of the first video, wherein the frame direction attribute comprises a lateral picture or a vertical picture.

10. The method according to claim 1, wherein the playing the first video on the video taking page in the form of the floating window comprises:
cyclically playing the first video on the video taking page in the form of the floating window.

11. A non-transitory computer-readable storage medium, wherein the computer-readable storage medium stores instructions; and the instructions, when run on a terminal device, cause the terminal device to implement operations comprising:
playing a first video on a video taking page in a form of a floating window, wherein the video taking page presents a taken image preview region and a video taking control, the taken image preview region is configured to present a taken image in preview, the first video is configured to prompt a video taking style;
in response to a triggering operation on the video taking control, recording the taken image in the taken image preview region to generate a second video, wherein the second video and the first video have a same style;
wherein before the playing the first video on the video taking page in the form of the floating window, the operations further comprise in response to a preset triggering operation on the first video, presenting a detail page of the first video, wherein a video taking entry is configured on the detail page; and
wherein the playing the first video on the video taking page in the form of the floating window further comprises:
in response to a triggering operation on the video taking entry on the detail page of the first video, jumping to the video taking page from the detail page, and playing the first video on the video taking page in the form of the floating window.

12. The non-transitory computer-readable storage medium according to claim 11, wherein before the playing the first video on the video taking page in the form of the floating window, the operations further comprise:
presenting a first panel on the video taking page, wherein the first panel presents images respectively corresponding to a plurality of videos comprising the first video; and
the playing the first video on the video taking page in the form of the floating window comprises:
in response to a preset selection operation on an image corresponding to the first video presented on the first panel, playing the first video on the video taking page in the form of the floating window.

13. The non-transitory computer-readable storage medium according to claim 11, wherein the first video is determined based on an image recognition result and/or current positioning information of the taken image in the taken image preview region on the video taking page.

14. A device, comprising a memory, a processor, and a computer program stored on the memory and runnable on the processor, wherein the processor, when executing the computer program, implements operations comprising:
playing a first video on a video taking page in a form of a floating window, wherein the video taking page presents a taken image preview region and a video taking control, the taken image preview region is configured to present a taken image in preview, the first video is configured to prompt a video taking style;
in response to a triggering operation on the video taking control, recording the taken image in the taken image preview region to generate a second video, wherein the second video and the first video have a same style;
wherein before the playing the first video on the video taking page in the form of the floating window, the operations further comprise in response to a preset triggering operation on the first video, presenting a detail page of the first video, wherein a video taking entry is configured on the detail page; and
wherein the playing the first video on the video taking page in the form of the floating window further comprises:
in response to a triggering operation on the video taking entry on the detail page of the first video, jumping to the video taking page from the detail page, and playing the first video on the video taking page in the form of the floating window.

15. The device according to claim 14, wherein before the playing the first video on the video taking page in the form of the floating window, the operations further comprise:
presenting a first panel on the video taking page, wherein the first panel presents images respectively corresponding to a plurality of videos comprising the first video; and
the playing the first video on the video taking page in the form of the floating window comprises:
in response to a preset selection operation on an image corresponding to the first video presented on the first panel, playing the first video on the video taking page in the form of the floating window.

16. The device according to claim 15, wherein the presenting a first panel on the video taking page comprises:
in response to a triggering operation on a preset first control on the video taking page, presenting the first panel on the video taking page;
or,
presenting the first panel on the video taking page based on an image recognition result and/or current positioning information of the taken image in the taken image preview region on the video taking page, wherein the first panel displays images respectively corresponding to videos determined based on the image recognition result and/or the current positioning information.

17. The device according to claim 14, wherein the first video is determined based on an image recognition result and/or current positioning information of the taken image in the taken image preview region on the video taking page.

18. The device according to claim 14, wherein before the presenting a detail page of the first video in response to a preset triggering operation on the first video in a first video stream, the operations further comprise:
   presenting a preset second control on a video taking template search page; and
   in response to a triggering operation on the preset second control, presenting the first video stream, the first video stream and a video taking template currently presented on the video taking template search page belonging to a same content category.

19. The device according to claim 14, wherein before the presenting a detail page of the first video in response to a preset triggering operation on the first video in a first video stream, the operations further comprise:
   in response to a triggering operation on a preset third control on a video playing page, presenting the first video stream corresponding to the preset third control.

20. The device according to claim 14, wherein before the presenting a detail page of the first video in response to a preset triggering operation on the first video in a first video stream, the operations further comprise:
   presenting the first video stream based on current positioning information.

\* \* \* \* \*